US009613105B1

(12) United States Patent
Huang et al.

(10) Patent No.: US 9,613,105 B1
(45) Date of Patent: Apr. 4, 2017

(54) STREAMLINED DATA ENTRY BASED ON DATA RELATIONSHIPS

(71) Applicant: INTUIT INC., Mountain View, CA (US)

(72) Inventors: Nankun Huang, San Diego, CA (US); Carol A. Howe, San Diego, CA (US); Christopher M. Dye, San Diego, CA (US); Robert Bamford, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 261 days.

(21) Appl. No.: 14/098,319

(22) Filed: Dec. 5, 2013

(51) Int. Cl.
*G06F 17/30* (2006.01)
(52) U.S. Cl.
CPC .............................. *G06F 17/30554* (2013.01)
(58) Field of Classification Search
CPC ......... G06F 17/30805; G06F 17/30725; G06F 17/30876; G06F 17/30719; G06F 17/30554
USPC ........................................................ 706/21
See application file for complete search history.

(56) References Cited

U.S. PATENT DOCUMENTS

| 7,974,903 | B2* | 7/2011 | Ziegler | G06Q 40/02 705/36 T |
| 9,027,094 | B1* | 5/2015 | Balazs | H04L 63/10 705/44 |
| 2006/0229896 | A1* | 10/2006 | Rosen | G06Q 10/1053 705/321 |
| 2008/0120129 | A1* | 5/2008 | Seubert | G06Q 10/06 705/35 |
| 2011/0270855 | A1* | 11/2011 | Antonysamy | G06F 17/30179 707/756 |
| 2013/0036038 | A1* | 2/2013 | Nisal | 705/35 |
| 2013/0332429 | A1* | 12/2013 | Arasachetty | G06F 17/30085 707/694 |

* cited by examiner

*Primary Examiner* — Syed Hasan
*Assistant Examiner* — Saba Ahmed
(74) *Attorney, Agent, or Firm* — Patterson & Sheridan, LLP

(57) ABSTRACT

During a data-entry technique, a subset of desired information is determined based on an attribute of the user (such as an identifier). For example, the subset of the information may be associated with at least a field in a document, and the remainder of the information may be associated with at least a second field. This second field may be: empty, related to the subset of the information, and/or redundant with the subset of the information. Using the determined subset of the information, the data-entry process may be simplified. In particular, a user may only have to provide the subset of the information, instead of all the information.

20 Claims, 6 Drawing Sheets

STREAMLINED DATA ENTRY BASED ON DATA RELATIONSHIPS

CROSS-REFERENCE TO RELATED APPLICATION

This application is related to U.S. Non-Provisional application Ser. No. 14/098,308, titled "Layout Reconstruction Using Spatial and Grammatical Constraints," by Clarence Huang, Carol Howe, Christopher Dye and Bob Bamford, and filed on the same day as the instant application, the contents of which are herein incorporated by reference.

BACKGROUND

The present disclosure relates to a technique for entering data into a software application. More specifically, the present disclosure relates to a technique for simplifying data entry by eliminating redundant information using relationships between portions of the data.

Many software applications require users to manually enter data. For example, a user may be prompted to type in data from a document, such as numerical values in different fields in the document. However, data entry is a time-consuming and prone to error, which degrades the user experience.

SUMMARY

The disclosed embodiments relate to a computer system that receives a subset of information associated with a document. During operation, the computer system receives an attribute of a user. Then, the computer system determines the subset of the information based on the attribute. Moreover, the computer system requests the subset of the information, where the subset of the information is associated with at least a first field in the document, and a remainder of the information is associated with at least a second field in the document that is: empty, related to the subset of the information, and/or redundant with the subset of the information. Next, the computer system receives the subset of the information.

Note that the attribute may include an identifier of the user. For example, the attribute may be associated with income-tax information of the user.

Moreover, the document may include an income-tax-related document.

Furthermore, determining the subset of the information may involve looking up a predetermined conditional probability based on the attribute, where the predetermined conditional probability specifies: a relationship between the subset of the information associated with the first field and the remainder of the information associated with the second field; and/or a likelihood that the second field is empty. Additionally, determining the subset of the information may involve selecting the subset of the information based on the predetermined conditional probability and a threshold value. In some embodiments, prior to determining the subset of the information, the computer system calculates the conditional probability by analyzing instances of the document for a set of users having associated attributes.

Moreover, after receiving the subset of the information, the computer system may populate the first field in the document. Furthermore, after populating the first field, the computer system may present the document.

Another embodiment provides a method that includes at least some of the operations performed by the computer system.

Another embodiment provides a computer-program product for use with the computer system. This computer-program product includes instructions for at least some of the operations performed by the computer system.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a computer system, a technique for receiving a subset of information associated with a document, and a computer-program product (e.g., software) for use with the computer system are described. During this data-entry technique, a subset of desired information is determined based on an attribute of the user (such as an identifier). For example, the subset of the information may be associated with at least a field in a document, and the remainder of the information may be associated with at least a second field. This second field may be: empty, related to the subset of the information, and/or redundant with the subset of the information. Using the determined subset of the information, the data-entry process may be simplified. In particular, a user may only have to provide the subset of the information, instead of all the information.

By simplifying the data-entry process, the data entry may be easier, less time-consuming and more accurate, which may improve the user experience and reduce user frustration. Therefore, the data-entry technique may improve customer retention and increase sales of software that uses the data-entry technique and, thus, may increase the revenue of a provider of the data-entry technique.

In the discussion that follows, a user may include: an individual or a person (for example, an existing customer, a new customer, a service provider, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc.

Figure 1:
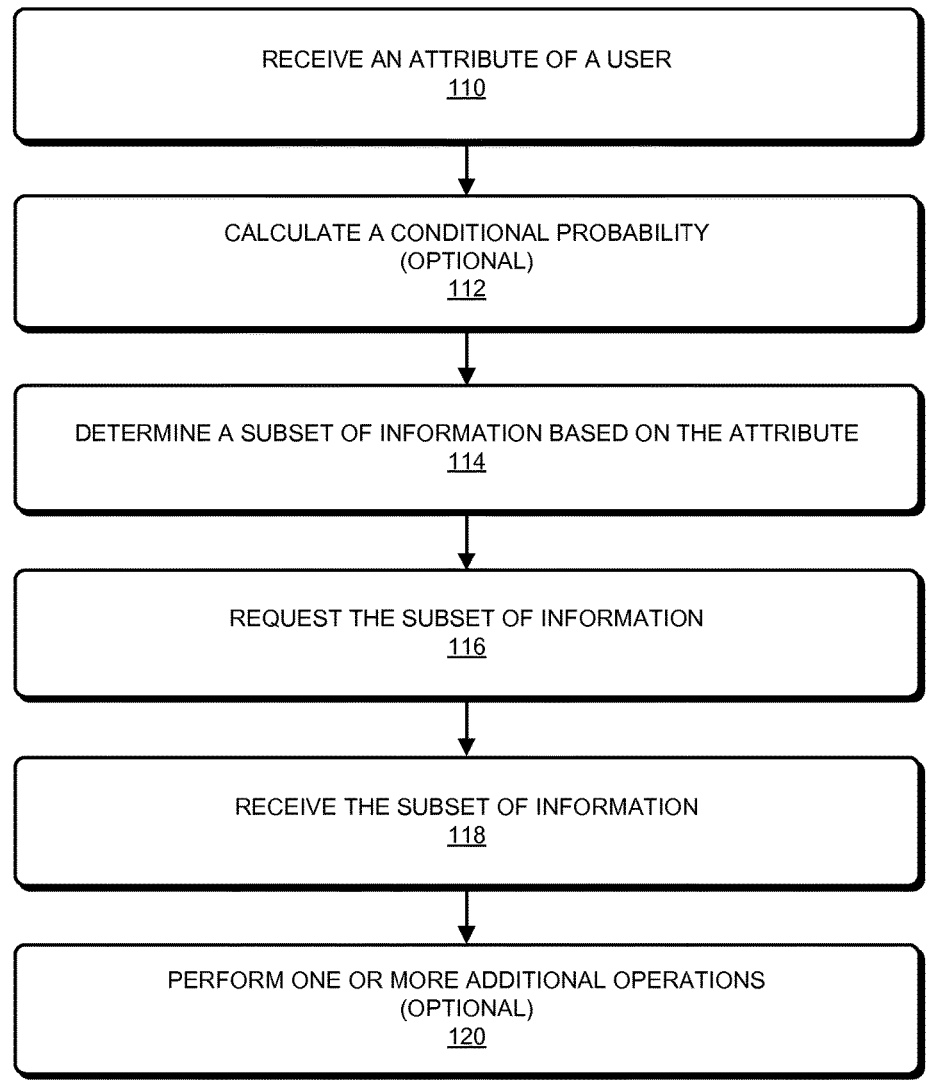
FIG. 1 is a flow chart illustrating a method for receiving a subset of information associated with a document in accordance with an embodiment of the present disclosure.

We now describe embodiments of the data-entry technique. FIG. 1 presents a flow chart illustrating a method 100 for receiving a subset of information associated with a document, which may be performed by a computer system (such as computer system 600 in FIG. 6). During operation, the computer system receives an attribute of a user (operation 110), such as an identifier of the user. As described further below with reference to FIG. 5, the attribute may be received from the user or from an application (such as a software application) being used by the user.

For example, the attribute may be associated with income-tax information of the user. In particular, the attribute may be a numerical identifier (such as a Social Security number or an Employee Identification Number). Alternatively, the attribute may be a filing status of the user (such as: married, single, head of household, etc.). Moreover, the document may include an income-tax-related document, such as a 1099, W2 or 1040EZ form of the user.

Then, the computer system determines the subset of the information based on the attribute (operation 114). This may involve looking up a predetermined conditional probability based on the attribute. The predetermined conditional probability may specify: a relationship between the subset of the information associated with the first field and the remainder of the information associated with the second field; and/or a likelihood that the second field is empty. Additionally, determining the subset of the information may involve selecting the subset of the information based on the predetermined conditional probability and a threshold value. For example, the subset of the information may exclude those fields (such as the second field) for which the conditional probability of having the same content as the first field exceeds the threshold value or for which the conditional probability of being empty exceeds the threshold value.

Alternatively, instead of using the predetermined conditional probability, the computer system may optionally calculate the conditional probability (operation 112). For example, the conditional probability may be calculated by analyzing instances of the document for a set of users having associated attributes. In an exemplary embodiment, an expert system may bootstrap or construct the conditional probabilities between fields or boxes in the documents, e.g., by calculating a Bayesian network. In this way, relationships between fields and/or empty fields may be determined for users having particular attributes.

Moreover, the computer system requests the subset of the information (operation 116), where the subset of the information is associated with at least a first field in the document, and a remainder of the information is associated with at least a second field in the document that is: empty, related to the subset of the information, and/or redundant with the subset of the information.

Next, the computer system receives the subset of the information (operation 118).

Moreover, after receiving the subset of the information (operation 118), the computer system may optionally perform one or more additional operations (operation 120). For example, the computer system may use the subset of the information to populate the first field in the document. Furthermore, after populating the first field, the computer system may present the document. In this way, the subset of the information may be used in income-tax documents, e.g., when preparing an income-tax return for the user. In addition, the document may be presented with the subset of the information entered into at least the first field so the user can verify that it is correct or accurate. Using the format of the document may facilitate this operation, by ensuring that the subset of the information is presented to the user in the same way as it appears in the copy of the document that the user has.

Figure 2:
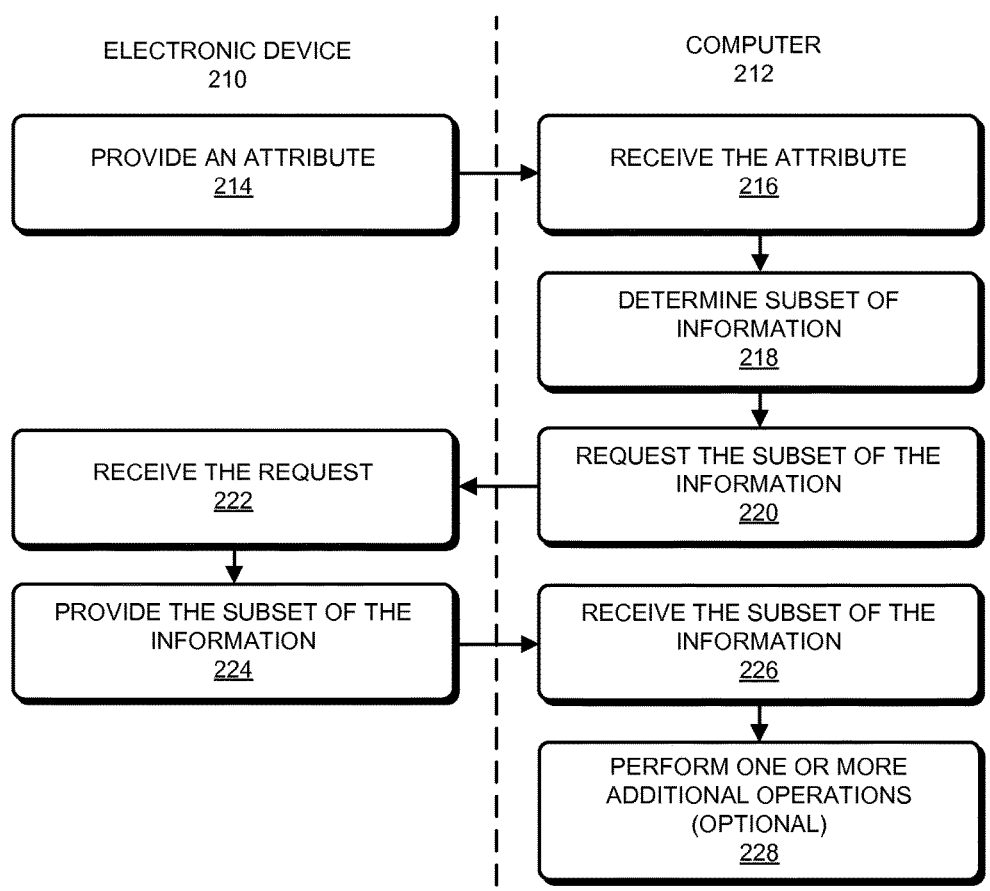
FIG. 2 is a flow chart illustrating the method of FIG. 1 in accordance with an embodiment of the present disclosure.

In an exemplary embodiment, the data-entry technique is implemented using an electronic device (such as a computer or a portable electronic device, e.g., a cellular telephone) and a computer, which communicate through a network, such as a cellular-telephone network and/or the Internet (e.g., using a client-server architecture). This is illustrated in FIG. 2, which presents a flow chart illustrating method 100 (FIG. 1).

During the method, electronic device 210 provides (operation 214) and computer 212 receives (operation 216) the attribute of the user. For example, the user may use electronic device 210 to provide the attribute.

Based on the attribute, computer 212 determines the subset of the information (operation 218). As noted previously, this may involve looking up the predetermined conditional probability or calculating the conditional probability.

Then, computer 212 requests the subset of the information (operation 220). This request is received (operation 222) by electronic device 210.

In response, electronic device 210 provides (operation 224) and computer 212 receives (operation 226) the subset of the information. For example, the user may use electronic device 210 to provide the subset of the information.

As noted previously, computer 212 may optionally perform one or more additional operations (operation 228). For example, computer 212 may populate the first field in the document and/or may present the document. In particular, computer 212 may provide the document to electronic device 210, which then displays the document to the user.

In some embodiments of method 100 (FIGS. 1 and 2), there may be additional or fewer operations. Moreover, the order of the operations may be changed, and/or two or more operations may be combined into a single operation. For example, the optional calculation of the conditional probability in operation 112 in FIG. 1 may occur before the attribute is received in operation 110.

Figure 3:
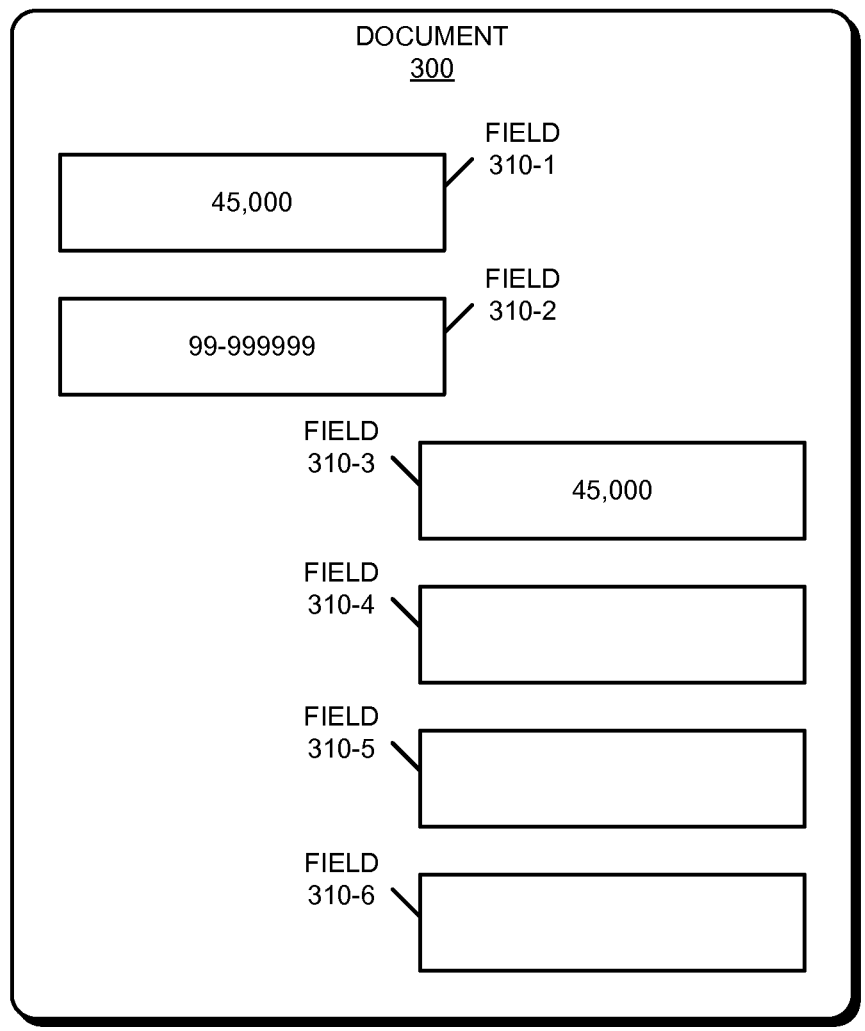
FIG. 3 is a drawing illustrating an income-tax document in accordance with an embodiment of the present disclosure.

In an exemplary embodiment, the data-entry technique is used to simplify data entry of income-tax information from an income-tax form. In particular, the income-tax forms for a given user may include redundant information (such as different fields that include the same or related information) and/or empty fields. This is shown in FIG. 3, which presents a drawing of an income-tax document 300. Note that fields 310-1 and 310-3 include the same information, and fields 310-4, 310-5 and 310-6 are empty.

The relationships between the fields in income-tax documents may be calculated by analyzing multiple income-tax documents for multiple users having attributes. For example, W2 forms for users that have different filing statuses may be analyzed to determine the likelihood that the fields in the W2 forms are related or include the same information, and/or are empty.

Figure 4:
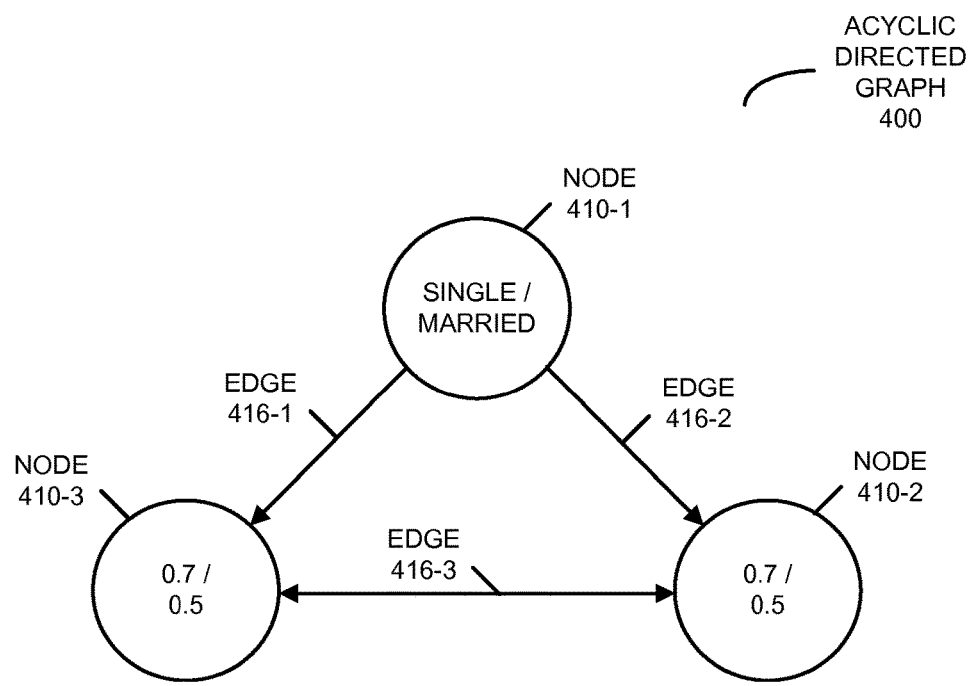
FIG. 4 is a drawing illustrating an acyclic directed graph in accordance with an embodiment of the present disclosure.

The resulting conditional probabilities may be summarized in an acyclic directed graph. This is shown in FIG. 4, which presents a drawing of an acyclic directed graph 400. In particular, nodes 410 and edges 412 in acyclic directed graph 400 summarize the relationships between boxes 1 and 3 in a 1040EZ form of a user (as indicated by the edges) with a 'single' filing status versus a 'married' filing status. Thus, boxes 1 and 3 may be highly correlated (i.e., may likely have the same information) for a user with a 'single' filing status (as indicated by the conditional probability of 0.7), while the relationship between these boxes may be weaker if the user has a 'married' filing status (as indicated by the conditional probability of 0.5).

If the computer system receives the attribute for the user indicating a 'single' filing status, and the threshold value is 0.6, the computer system may determine that boxes 1 and 3 have the same information. Consequently, box 1 may be included in the subset of the information, and box 3 may be included in the remainder of the information. When income-tax preparation software requests the subset of the information from the user, the user may enter the value in box 1 of their 1040EZ form, but may not have to enter the value in box 3 of their 1040EZ form.

In another example, the document may be a user's W2 form. For a single filer, the acyclic directed graph may indicate that boxes 5 and 6 contain the same information, while boxes 18, 19 and 20 are empty (i.e., they contain no information).

In this way, the joint probability distribution summarized in the nodes in acyclic directed graph 400 may be used to significantly simplify the data-entry process. In particular, instead of asking the user to enter information in 20 boxes or fields in an income-tax document, the user may only need to enter the information in four or five boxes or fields.

In some embodiments, the data-entry technique is used to determine if the user is more likely to have more than one document, such as more than one 1099INT form or more than one W2 form. This estimate may be based on the prior year's income-tax returns (for example, the user may provide their Social Security number or their Employer Identification Number, which may allow the previous income-tax returns or information summarizing the previous income-tax returns to be accessed) or by analysis of multiple users' income-tax returns. If the user is likely to have more than one W2 form (such as when the user is married), then the income-tax preparation software may request the user's W2 form and then may ask for the spouse's W2 form.

Alternatively, if the user is not likely to have more than one W2 form), then the income-tax preparation software may only request the user's W2 form, thereby simplifying the data-entry process. For example, if the user has a marital status or 'single' and lives in the 92130 ZIP code (both of which may be attributes of the user), the computer system may analyze (or may have previously analyzed) financial histories of other users to determine that 63.2% of the users in this ZIP code who are single have only one W2 form. Consequently, the computer system may only request information from a single copy of a W2 form from the user.

While the preceding discussion illustrated the data-entry technique being used by an individual or a software application used by the individual, in other embodiments the data-entry technique may be offered as a service to other software providers. Consequently, the data-entry technique may be used with a wide variety of software, including: income-tax preparation software, accounting software, payroll software, software that includes a user interface, and other types of software which requests data from users.

Figure 5:
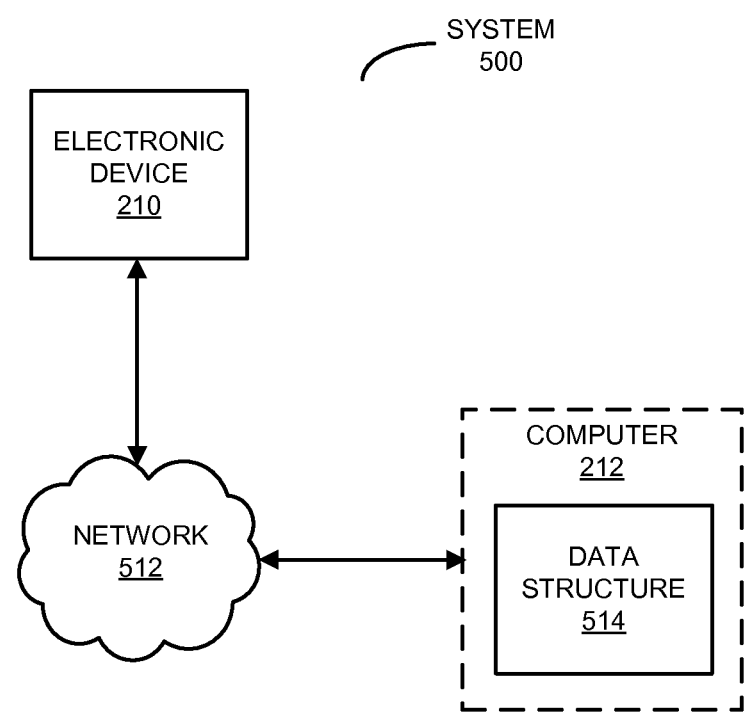
FIG. 5 is a block diagram illustrating a system that performs the method of FIGS. 1 and 2 in accordance with an embodiment of the present disclosure.

We now describe embodiments of a system and the computer system, and their use. FIG. 5 presents a block diagram illustrating a system 500 that can be used, in part, to perform operations in method 100 (FIGS. 1 and 2). In this system, during the data-entry technique a user of electronic device 210 may use a software product, such as a software application that is resident on and that executes on electronic device 210. (Alternatively, the user may interact with a web page that is provided by computer 212 via network 512, and which is rendered by a web browser on electronic device 210. For example, at least a portion of the software application may be an application tool that is embedded in the web page, and which executes in a virtual environment of the web browser. Thus, the application tool may be provided to the user via a client-server architecture.) This software application may be a standalone application or a portion of another application that is resident on and which executes on electronic device 210 (such as a software application that is provided by computer 212 or that is installed and which executes on electronic device 210).

During the data-entry technique, the user may use the software application (such as income-tax preparation software) to provide the attribute to computer 212 via network 512. In response, computer 212 may determine the subset of the information based on the attribute. As noted previously, this may involve looking up the predetermined conditional probability or calculating the conditional probability (for example, by applying one or more machine-learning techniques to documents of one or more users). For example, the predetermined conditional probability may be included in data structure 514, and may be accessed or looked up using the attribute.

Then, computer 212 may request the subset of the information from electronic device 210 via network 512. After receiving this request, computer 212 may provide the subset of the information to computer 212 via network 512. For example, the requested subset of the information may be displayed on electronic device 210, and the user may enter the subset of the information. This data-entry process may involve a variety of user interfaces, such as: voice recognition, optical character recognition, a keyboard, a touch-sensitive screen (or a 'touchscreen'), a mouse, a trackball, etc. Thus, the subset of the information may be provided to computer 212 using alphanumeric text, sound, handwritten notes, etc.

As noted previously, after receiving the subset of the information, computer 212 may optionally perform one or more additional operations.

Note that information in system 500 may be stored at one or more locations in system 500 (i.e., locally or remotely). Moreover, because this data may be sensitive in nature, it may be encrypted. For example, stored data and/or data communicated via network 512 may be encrypted.

Figure 6:
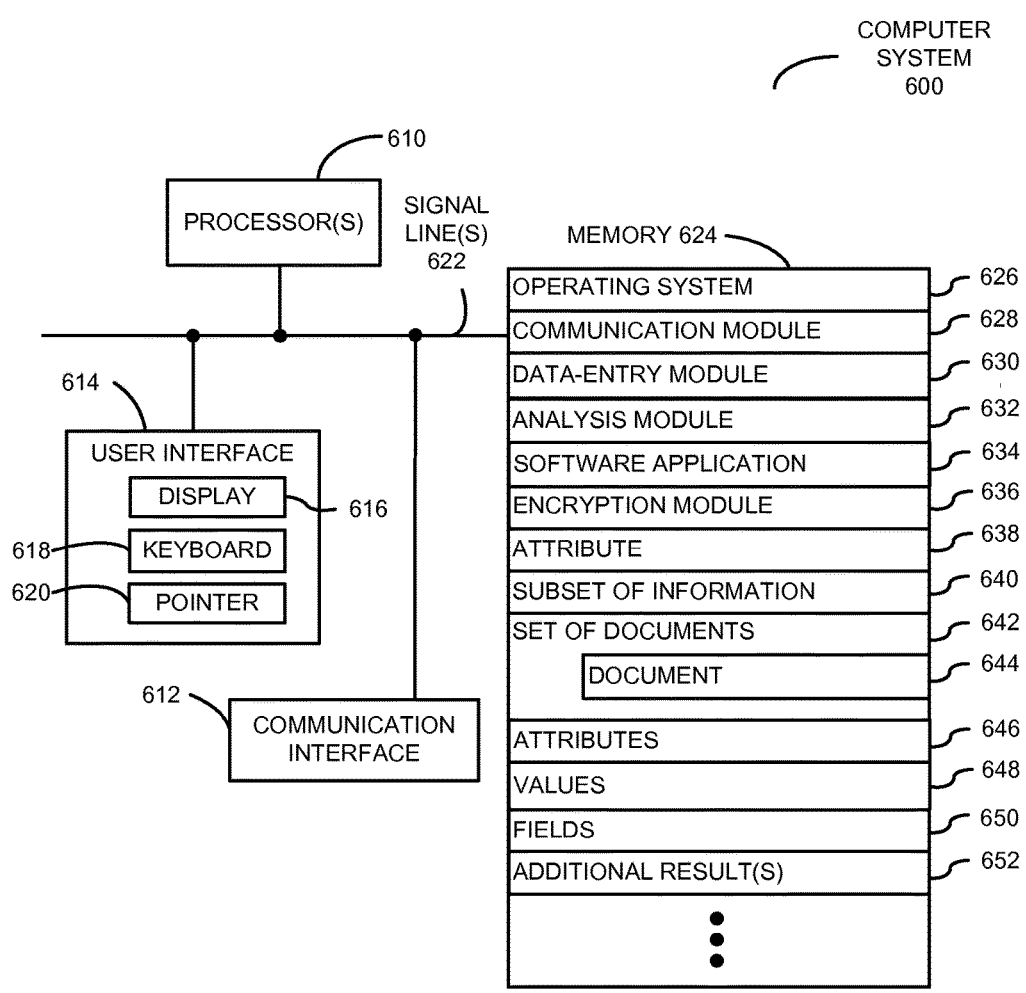
FIG. 6 is a block diagram illustrating a computer system that performs the method of FIGS. 1 and 2 in accordance with an embodiment of the present disclosure.

FIG. 6 presents a block diagram illustrating a computer system 600 that performs method 100 (FIGS. 1 and 2), such as computer 212 (FIGS. 2 and 5). Computer system 600 includes one or more processing units or processors 610, a communication interface 612, a user interface 614, and one or more signal lines 622 coupling these components together. Note that the one or more processors 610 may support parallel processing and/or multi-threaded operation, the communication interface 612 may have a persistent communication connection, and the one or more signal lines 622 may constitute a communication bus. Moreover, the user interface 614 may include: a display 616, a keyboard 618, and/or a pointer 620, such as a mouse.

Memory 624 in computer system 600 may include volatile memory and/or non-volatile memory. More specifically, memory 624 may include: ROM, RAM, EPROM, EEPROM, flash memory, one or more smart cards, one or more magnetic disc storage devices, and/or one or more optical storage devices. Memory 624 may store an operating system 626 that includes procedures (or a set of instructions) for handling various basic system services for performing hardware-dependent tasks. Memory 624 may also store procedures (or a set of instructions) in a communication module 628. These communication procedures may be used for communicating with one or more computers and/or servers, including computers and/or servers that are remotely located with respect to computer system 600.

Memory 624 may also include multiple program modules (or sets of instructions), including: data-entry module 630 (or a set of instructions), analysis module 632 (or a set of instructions), software application 634 (or a set of instructions) and/or encryption module 636 (or a set of instructions). Note that one or more of these program modules (or sets of instructions) may constitute a computer-program mechanism.

During the data-entry technique, data-entry module 630 may receive an attribute 638 (such as an identifier of the user or the user's filing status) from a user via communication interface 612 and communication module 628. Then, data-entry module 630 may determine a subset of information 640 associated with a document 644 in a set of documents 642. For example, data-entry module 630 may look up a predetermined subset of information based on attribute 638 (which may specify relationships between one or more fields in document 644 and/or a likelihood that one or more fields in document 644 are empty). Note that subset of information 640 may be directly or indirectly specified. Consequently, in some embodiments data-entry module 630 may select subset of information 640 based on the accessed information.

Subset of information 640 may be calculated by analysis module 632. For example, analysis module 632 may calculate subset of information 640 using set of documents 642 and attributes 646 of multiple users. In particular, the relationships between the one or more fields in document 644 and/or the likelihood that the one or more fields in document 644 are empty may be calculated using machine-learning techniques. In an exemplary embodiment, fields in documents of users having a common attribute (such as a 'married' filing status) may be compared so that conditional probabilities can be calculated. These conditional probabilities may be stored in a data structure that represents an acyclic directed graph (or, alternatively, another type of graph or tabular representation) so that they can be accessed when computer system 600 receives attribute 638. In some embodiments, analysis module 632 calculates subset of information 640 prior to when computer system 600 receives attribute 638. Alternatively, in some embodiments analysis module 632 calculates subset of information 640 after computer system 600 receives attribute 638.

Next, data-entry module 630 may request subset of information 640 from the user via communication module 628 and communication interface 612, and may receive values 648 from the user via communication interface 612 and communication module 628.

In response, data-entry module 630 may perform one or more additional operations. For example, data-entry module 630 may populate fields 650 in document 644 with values 648. Furthermore, data-entry module 630 may communicate the populated document to the user via communication module 628 and communication interface 612. Thus, the populated document may be displayed on the user's electronic device so that the user can verify that values 648 are correct. Additionally, software application 634 may use values 648 to determine one or more additional result(s) 652 for the user. For example, software application 634 may prepare an income-tax return for the user.

Because information used in the data-entry technique may be sensitive in nature, in some embodiments at least some of the data stored in memory 624 and/or at least some of the data communicated using communication module 628 is encrypted or decrypted using encryption module 636.

Instructions in the various modules in memory 624 may be implemented in: a high-level procedural language, an object-oriented programming language, and/or in an assembly or machine language. Note that the programming language may be compiled or interpreted, e.g., configurable or configured, to be executed by the one or more processors 610.

Although computer system 600 is illustrated as having a number of discrete items, FIG. 6 is intended to be a functional description of the various features that may be present in computer system 600 rather than a structural schematic of the embodiments described herein. In some embodiments, some or all of the functionality of computer system 600 may be implemented in one or more application-specific integrated circuits (ASICs) and/or one or more digital signal processors (DSPs).

Computer system 600, as well as electronic devices, computers and servers in system 600, may include one of a variety of devices capable of manipulating computer-readable data or communicating such data between two or more computing systems over a network, including: a personal computer, a laptop computer, a tablet computer, a mainframe computer, a portable electronic device (such as a cellular telephone or PDA), a server, a point-of-sale terminal and/or a client computer (in a client-server architecture). Moreover, network 512 (FIG. 5) may include: the Internet, World Wide Web (WWW), an intranet, a cellular-telephone network, LAN, WAN, MAN, or a combination of networks, or other technology enabling communication between computing systems.

Electronic device 210 (FIGS. 2 and 5), computer 212 (FIGS. 2 and 5), system 500 (FIG. 5), and/or computer system 600 may include fewer components or additional components. Moreover, two or more components may be combined into a single component, and/or a position of one or more components may be changed. In some embodiments, the functionality of electronic device 210 (FIGS. 2 and 5), computer 212 (FIGS. 2 and 5), system 500 (FIG. 5) and/or computer system 600 may be implemented more in hardware and less in software, or less in hardware and more in software, as is known in the art.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-implemented method for streamlining data entry at a graphical user interface (GUI) of the computer, the method comprising:
   requesting an attribute of a user of the computer, the request being displayed as a message at the graphical user interface;
   receiving the attribute from the user via the graphical user interface;
   using the computer, determining a first conditional probability of a first relationship between a first field and a second field of a document based on the attribute, wherein the first conditional probability of the first relationship indicates a likelihood that content of the second field is the same as content of the first field based on the attribute;
if the first conditional probability satisfies a first threshold, requesting data for the first field, populating the first field with the data, and automatically populating the second field with the data of the first field; and
if the first conditional probability does not satisfy the first threshold, performing one of leaving the second field empty and requesting data for the second field.

2. The method of claim 1, wherein the attribute includes an identifier of the user.

3. The method of claim 1, wherein the attribute is associated with income-tax information of the user.

4. The method of claim 1, wherein the document includes an income-tax-related document.

5. The method of claim 1, wherein determining the first conditional probability comprises looking up the first conditional probability based on the attribute.

6. The method of claim 5, further comprising calculating the first conditional probability by analyzing instances of the document for a set of users having associated attributes.

7. The method of claim 1, wherein, after populating the second field, the method further comprises presenting the document at the graphical user interface.

8. A computer-program product for use in conjunction with a computer system, the computer-program product comprising a non-transitory computer-readable storage medium and a computer-program mechanism embedded therein to streamline data entry at a graphical user interface (GUI) of a computer, the computer-program mechanism comprising instructions for:
requesting an attribute of a user of the computer, the request being displayed as a message at the graphical user interface;
receiving the attribute from the user via the graphical user interface;
using the computer, determining a first conditional probability of a first relationship between a first field and a second field of a document based on the attribute, wherein the first conditional probability of the first relationship indicates a likelihood that content of the second field is the same as content of the first field based on the attribute;
if the first conditional probability satisfies a first threshold, requesting data for the first field, populating the first field with the data, and automatically populating the second field with the data of the first field; and
if the first conditional probability does not satisfy the first threshold, performing one of leaving the second field empty and requesting data for the second field.

9. The computer-program product of claim 8, wherein the attribute includes an identifier of the user.

10. The computer-program product of claim 8, wherein the attribute is associated with income-tax information of the user.

11. The computer-program product of claim 8, wherein the document includes an income-tax-related document.

12. The computer-program product of claim 8, wherein determining the first conditional probability comprises looking up the first conditional probability based on the attribute.

13. The computer-program product of claim 12, wherein the computer-program mechanism further comprises instructions for calculating the first conditional probability by analyzing instances of the document for a set of users having associated attributes.

14. The computer-program product of claim 1, wherein, after the instructions for populating the second field, the computer-program mechanism further includes instructions for presenting the document at the graphical user interface.

15. A computer system, comprising:
a processor;
memory; and
a program module, wherein the program module is stored in the memory and configurable to be executed by the processor to streamline data entry at a graphical user interface (GUI) of a computer, the program module including instructions for:
requesting an attribute of a user of the computer, the request being displayed as a message at the graphical user interface;
receiving the attribute from the user via the graphical user interface;
using the computer, determining a first conditional probability of a first relationship between a first field and a second field of a document based on the attribute, wherein the first conditional probability of the first relationship indicates a likelihood that content of the second field is the same as content of the first field based on the attribute;
if the first conditional probability satisfies a first threshold, requesting data for the first field, populating the first field with the data, and automatically populating the second field with the data of the first field; and
if the first conditional probability does not satisfy the first threshold, performing one of leaving the second field empty and requesting data for the second field.

16. The computer system of claim 15, wherein determining the first conditional probability comprises looking up the first conditional probability based on the attribute.

17. The method of claim 1, wherein the document includes a field for the attribute that is different from the first field and the second field, and wherein the attribute is different from data for the first field and data for the second field.

18. The method of claim 1, further comprising:
determining a second conditional probability related to the second field based on the attribute, wherein the second conditional probability indicates a likelihood that the second field is empty based on the attribute, wherein performing one of leaving the second field empty and requesting data for the second field is based on whether the second conditional probability satisfies a second threshold.

19. The computer program product of claim 8, wherein the computer-program mechanism further comprises instructions for:
determining a second conditional probability related to the second field based on the attribute, wherein the second conditional probability indicates a likelihood that the second field is empty based on the attribute, wherein performing one of leaving the second field empty and requesting data for the second field is based on whether the second conditional probability satisfies a second threshold.

20. The computer system of claim 15, wherein the program module further comprises instructions for:
determining a second conditional probability related to the second field based on the attribute, wherein the second conditional probability indicates a likelihood that the second field is empty based on the attribute, wherein performing one of leaving the second field empty and requesting data for the second field is based on whether the second conditional probability satisfies a second threshold.

* * * * *